United States Patent
Liu et al.

(10) Patent No.: US 7,550,940 B2
(45) Date of Patent: Jun. 23, 2009

(54) OVERLOAD CURRENT CONTROL CIRCUIT FOR A DC MOTOR

(75) Inventors: Ming-Hsin Liu, Taichung (TW); Wei-Yun Chiang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 132 days.

(21) Appl. No.: 11/847,311

(22) Filed: Aug. 29, 2007

(65) Prior Publication Data

US 2009/0059445 A1     Mar. 5, 2009

(51) Int. Cl.
*H02P 7/00*    (2006.01)

(52) U.S. Cl. .................. 318/432; 318/434; 388/815

(58) Field of Classification Search .................. 361/31; 318/432, 434, 139; 388/815, 800, 903, 909, 388/930
See application file for complete search history.

(56) References Cited

U.S. PATENT DOCUMENTS

2008/0239767 A1* 10/2008 Zheng et al. ............. 363/21.16

* cited by examiner

*Primary Examiner*—Karen Masih
(74) *Attorney, Agent, or Firm*—Banger Shia

(57) ABSTRACT

An overload current control circuit for a DC motor comprises: a DC motor, a DC power source, a power semiconductor assembly, and a sampling resistor that are connected in series. The overload current control circuit further comprises a voltage polarity switching circuit that is connected to a circuit between the sampling resistor and the overload protection and detection circuit to control the single polarity of the sampling voltage of the first and second terminals of the sampling resistor, so as to provide constant voltage potential to the overload protection and detection circuit, thus providing overload protection to the DC motor.

3 Claims, 2 Drawing Sheets

OVERLOAD CURRENT CONTROL CIRCUIT FOR A DC MOTOR

BACKGROUND OF THE INVENTION

1. Field of the Invention

The present invention relates to a DC motor, and more particularly to an overload current control circuit for a DC motor.

2. Description of the Prior Art

The characteristic of DC (direct current) is that its working direction is constant, however, the function of a DC motor is to convert electric power into mechanical power, and the DC motor generally comprises a DC generator for converting mechanic power into electric power and a DC motor for converting electric power into mechanical power.

The existing overload current control circuit for a DC motor (as shown in FIG. 1) comprises: a DC motor P10, a DC power source P20, a power semiconductor assembly P30, and a sampling resistor P40 that are connected in series. And the overload current control circuit for a DC motor further comprises an overload protection and detection circuit P50 and a rotation direction switching relay P60.

The overload protection and detection circuit P50 is connected in parallel to the sampling resistor P40 and includes a comparator P51 with one end connected to the power semiconductor assembly P30 and the other end connected to a circuit between the DC motor P10 and the DC power source P20. The rotation direction switching relay P60 is connected in series to a circuit between the power semiconductor assembly P30 and the DC power source P20.

The DC power source P20 supplies power to the DC motor P10, at this moment, the current flows through the sampling resistor P40 to produce a sampling voltage. The comparator P51 of the overload protection and detection circuit P50 can tell if the DC motor P10 is overloaded by detecting the value of the sampling voltage. After the comparator P51 determines whether the current is overloaded, it will send out a LOW signal to disconnect the power semiconductor assembly P30, thus providing a protection function. However, such an overload current control circuit still has the following disadvantages:

The DC power source P20 has positive and negative polarities, when the DC power source P20 changes the polarity of the DC motor P10 by using the rotation direction switching relay P60, the sampling voltages at both ends of the sampling resistor P40 will change polarities alternatively. However, the comparator P51 of the overload protection and detection circuit P50 can only receive single polarity voltage and is unable to change polarity with the change of the polarity of the sampling voltage, so that the overload protection and detection circuit P50 cannot obtain a constant potential sampling voltage to determine overload, causing improper turning on or off of the power semiconductor assembly P30, and as a result, it is unable to provide timely protection to the DC motor P10.

The present invention has arisen to mitigate and/or obviate the afore-described disadvantages.

SUMMARY OF THE INVENTION

The primary objective of the present invention is to provide an overload current control circuit for a DC, which employs a voltage polarity switching circuit to control the single polarity, so as to provide constant voltage potential to the overload protection and detection circuit, and thus providing overload protection to the DC motor.

To achieve the abovementioned objective, the overload current control circuit for a DC in accordance with the present invention comprises: a DC motor, a DC power source, a power semiconductor assembly, and a sampling resistor that are connected together in series, the overload protection and detection circuit serving to turning on or off the DC motor by using the power semiconductor assembly.

The DC motor is driven by the DC power source. The overload current control circuit further comprises a voltage polarity switching circuit, an overload protection and detection circuit, and a power semiconductor assembly control circuit. The polarity switching circuit is connected to the sampling resistor. The overload protection and detection circuit is connected to the voltage polarity switching circuit and a power semiconductor assembly control circuit, respectively. The power semiconductor assembly control circuit is connected to the power semiconductor assembly and the DC motor. The voltage polarity switching circuit controls single polarity of a sampling voltage of the sampling resistor, so as to provide constant voltage potential to the overload protection and detection circuit, thus providing overload protection to the DC motor through the power semiconductor assembly control circuit.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
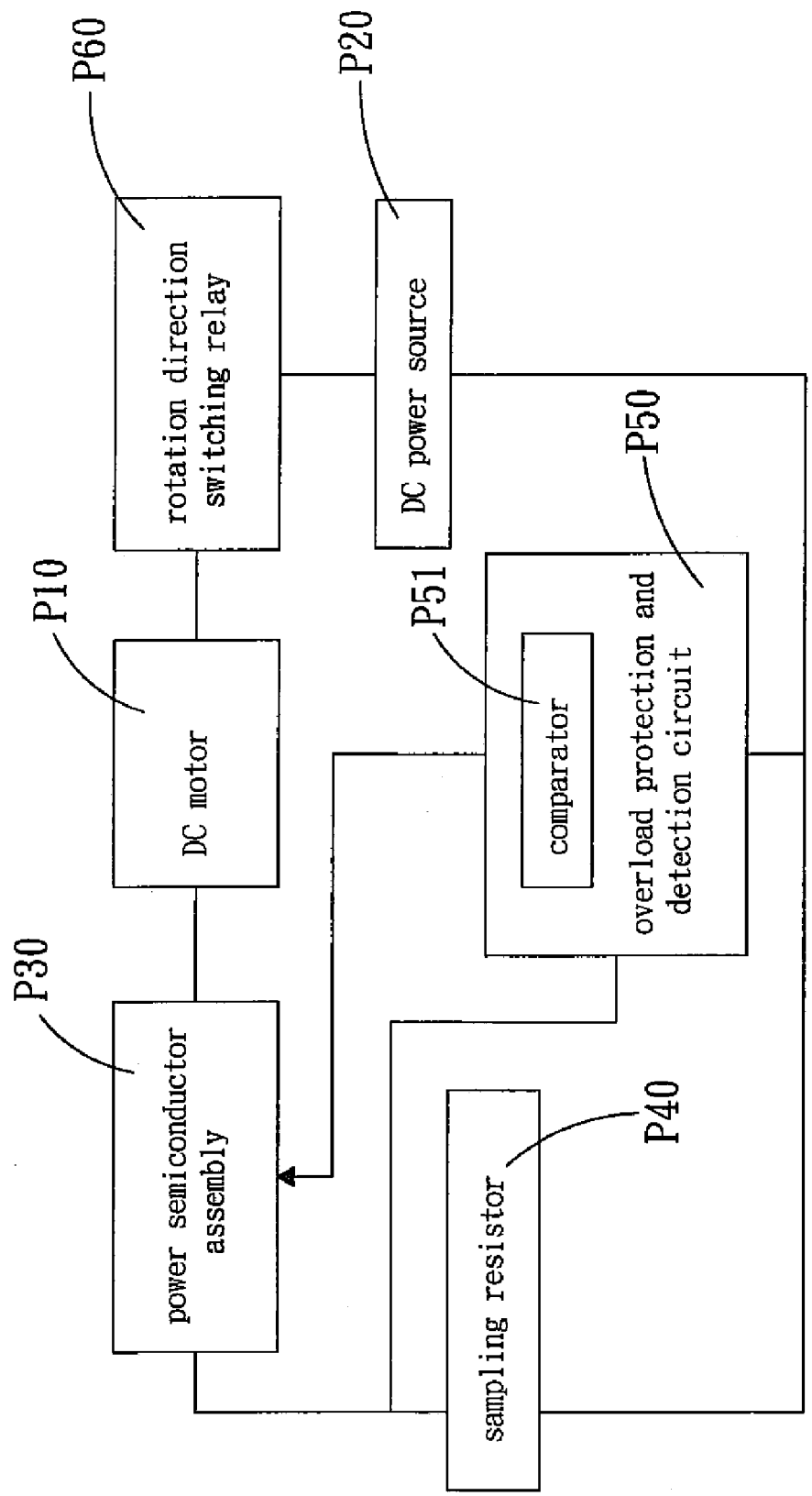
FIG. 1 is a circuit diagram of a conventional DC motor.
Figure 2:
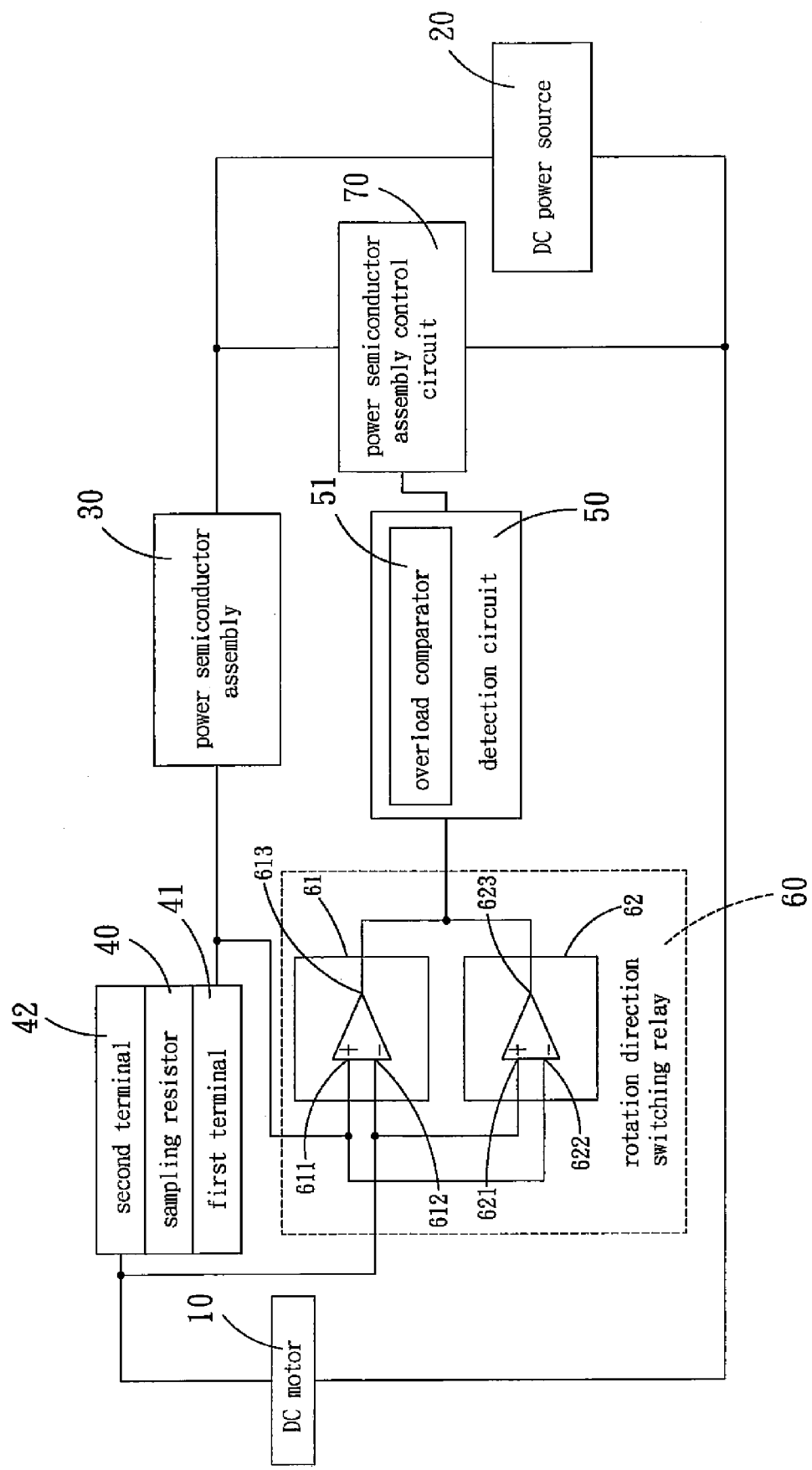
FIG. 2 is a circuit diagram of an overload current control circuit for a DC motor in accordance with the present invention.

Referring to FIG. 2, an overload current control circuit for a DC motor in accordance with the present invention comprises: a DC motor 10, a DC power source 20, a MOSFET (Metal Oxide Semiconductor Field Effect Transistor) power semiconductor assembly 30, and a sampling resistor 40 that are connected in series. The DC motor 10 is driven by the DC power source 20 and serves to convert electric power into mechanical power.

The sampling resistor 40 includes a first terminal 41 and a second terminal 42. The overload current control circuit further includes an overload protection and detection circuit 50, a voltage polarity switching circuit 60, and a power semiconductor assembly control circuit 70.

The overload protection and detection circuit 50 includes an overload comparator 51.

The voltage polarity switching circuit 60 is electrically connected to the sampling resistor 40 and the overload protection and detection circuit 50, respectively, and includes a first subtractor 61 and a second subtractor 62. The first subtractor 61 includes a positive input terminal 611, a negative input terminal 612 and an output terminal 613 that are electrically connected to the first and second terminals 41, 42 of the sampling resistor 40 and to the overload comparator 51 of the overload protection and detection circuit 50, respectively. The second subtractor 62 includes a positive input terminal 621, a negative input terminal 622 and an output terminal 623 that are electrically connected to the negative and positive input terminals 612 and 611 of the first subtractor 61 and to the overload comparator 51 of the overload protection and detection circuit 50, respectively.

The power semiconductor assembly control circuit 70 is connected in parallel to the DC power source 20 and is electrically connected to the overload comparator 51 of the overload protection and detection circuit 50.

For a better understanding of the present invention, its operation and function, please refer to FIG. 2 and the following descriptions about how to change to positive and negative input modes A and B by switching the polarity of the DC power source 20.

A. When the DC power source 20 outputs positive voltage, the sampling resistor 40 obtains a positive sampling voltage. When the voltage value of the positive input terminal 611 of the first subtractor 61 is greater than that of the negative input terminal 612, the voltage value of the output terminal 613 of the first subtractor 61 is the voltage drop of the sampling resistor 40. At this moment, the voltage value of the positive input terminal 621 of the second subtractor 62 is smaller than that of the negative input terminal 622. The voltage value of the output terminal 623 of the second subtractor 62 is 0 V due to the assembly characteristic. The subtractor of the overload protection and detection circuit 50 receives the voltage of the output terminal 613 of the first subtractor 61. The overload comparator 51 senses the voltage value of the output terminal 613, namely, it can tell if the DC motor 10 is overloaded or not. When the overload comparator 51 detects the overload, the overload protection and detection circuit 50 instructs the power semiconductor assembly control circuit 70 to disconnect the power semiconductor assembly 30, stopping the operation of the DC motor 10, and otherwise, the power semiconductor assembly is turned on.

B. When the DC power source 20 outputs negative voltage, the sampling resistor 40 obtains a negative sampling voltage. When the voltage value of the positive input terminal 611 of the first subtractor 61 is smaller than that of the negative input terminal 612, the voltage value of the output terminal 613 of the first subtractor 61 is 0 V due to the assembly characteristic. When the voltage value of the positive input terminal 621 of the second subtractor 62 is greater than that of the negative input terminal 622, the voltage value of the output terminal 623 of the second subtractor 62 is the voltage drop of the sampling resistor 40. The overload comparator 51 of the overload protection and detection circuit 50 receives the voltage of the output terminal 623 of the second subtractor 62 and senses the voltage value of the output terminal 623, so that it can tell if the DC motor 10 is overloaded or not. When the overload comparator 51 detects the overload, the overload protection and detection circuit 50 instructs the power semiconductor assembly control circuit 70 to disconnect the power semiconductor assembly 30, stopping the operation of the DC motor 10, and otherwise, the power semiconductor assembly 30 is turned on.

By such arrangements, the voltage polarity switching circuit 60 of the DC motor 10 uses the first and second subtractors 61, 62 to control the single polarity of the sampling voltage of the first and second terminals 41, 42 of the sampling resistor 40, so as to provide constant voltage potential to the overload protection and detection circuit 50, thus providing overload protection to the DC motor 10.

To summarize, an overload current control circuit for a DC motor in accordance with the present invention comprises: a DC motor, a DC power source, a power semiconductor assembly, and a sampling resistor that are connected in series. The overload current control circuit further comprises a voltage polarity switching circuit that is connected to a circuit between the sampling resistor and the overload protection and detection circuit to control the single polarity of the sampling voltage of the first and second terminals of the sampling resistor, so as to provide constant voltage potential to the overload protection and detection circuit, thus providing overload protection to the DC motor.

While we have shown and described various embodiments in accordance with the present invention, it is clear to those skilled in the art that further embodiments may be made without departing from the scope of the present invention.

What is claimed is:

1. An overload current control circuit for a DC motor comprising: a DC motor, a DC power source, a power semiconductor assembly, and a sampling resistor being connected together, the overload protection and detection circuit serving to turn on and off the DC motor by using the power semiconductor assembly; characterized in that:

the overload current control circuit further comprises a voltage polarity switching circuit and a power semiconductor assembly control circuit, the overload protection and detection circuit is connected to the voltage polarity switching circuit and the power semiconductor assembly control circuit, respectively, the polarity switching circuit is connected to the sampling resistor, the power semiconductor assembly control circuit is connected to the power semiconductor assembly, the voltage polarity switching circuit controls single polarity of a sampling voltage of the sampling resistor, so as to supply constant voltage potential to the overload protection and detection circuit, thus providing overload protection to the DC motor through the power semiconductor assembly control circuit.

2. The overload current control circuit for a DC motor as claimed in claim 1, wherein:

the sampling resistor includes a first terminal and a second terminal that are connected to the power semiconductor assembly and the DC motor, respectively;

the voltage polarity switching circuit includes a first subtractor and a second subtractor, the first subtractor includes a positive input terminal, a negative input terminal and an output terminal, the positive input terminal and the negative input terminal are connected to the first and second terminals of the sampling resistor, respectively, the second subtractor includes a positive input terminal, a negative input terminal and an output terminal, the positive and negative input terminals of the second subtractor are electrically connected to the negative and positive input terminals of the first subtractor, respectively;

the overload protection and detection circuit includes an overload comparator that is connected to the output terminal of the first subtractor and that of the second subtractor;

the power semiconductor assembly control circuit is connected in parallel to the DC power source and is further connected to the power semiconductor assembly, the DC motor, and the overload comparator of the overload protection and detection circuit, respectively.

3. The overload current control circuit for DC motor as claimed in claim 1, wherein the semiconductor assembly is a Metal Oxide Semiconductor Field Effect Transistor type power semiconductor assembly.

\* \* \* \* \*